(12) United States Patent
MacGregor et al.

(10) Patent No.: US 8,282,038 B2
(45) Date of Patent: Oct. 9, 2012

(54) BI-DIRECTIONAL FLIGHT CONTROL SURFACE UTILIZING A SPLIT-TRACK MECHANISM

(75) Inventors: Keith MacGregor, Bristol (GB); David Croston, Warwick (GB)

(73) Assignee: Airbus Operations Limited, Bristol (GB)

( * ) Notice: Subject to any disclaimer, the term of this patent is extended or adjusted under 35 U.S.C. 154(b) by 603 days.

(21) Appl. No.: 12/533,247

(22) Filed: Jul. 31, 2009

(65) Prior Publication Data

US 2010/0096497 A1    Apr. 22, 2010

(30) Foreign Application Priority Data

Aug. 11, 2008    (GB) .................................... 0814610.2

(51) Int. Cl.
*B64C 9/00* (2006.01)
(52) U.S. Cl. .......................................... 244/87; 244/216
(58) Field of Classification Search .................. 244/99.2, 244/99.3, 87, 88, 91, 213, 214, 215, 216, 244/217
See application file for complete search history.

(56) References Cited

U.S. PATENT DOCUMENTS

| | | | | |
|---|---|---|---|---|
| 4,181,275 A * | 1/1980 | Moelter et al. | ................. | 244/213 |
| 4,230,295 A * | 10/1980 | Eppler | ........................... | 244/213 |
| 4,247,065 A * | 1/1981 | Grob et al. | ..................... | 244/215 |
| 5,094,412 A * | 3/1992 | Narramore | ..................... | 244/214 |
| 7,243,881 B2 | 7/2007 | Sakurai et al. | | |
| 2011/0042525 A1* | 2/2011 | Parker | ........................... | 244/213 |

FOREIGN PATENT DOCUMENTS

| | | |
|---|---|---|
| EP | 0256374 A1 | 2/1988 |
| GB | 550713 | 1/1943 |
| GB | 2425100 A | 10/2006 |
| WO | 9732779 A1 | 9/1997 |

OTHER PUBLICATIONS

UK Search Report for GB0814610.2 dated Dec. 9, 2008.

* cited by examiner

*Primary Examiner* — Tien Dinh
*Assistant Examiner* — Michael A Fabula
(74) *Attorney, Agent, or Firm* — Lowe Hauptman Ham & Berner LLP

(57) ABSTRACT

A bi-directional flight control surface mechanism comprises a fixed part V of a vertical stabilizer having leading and trailing edges and a rudder having leading and trailing edges. The rudder is mounted relative to the fixed part of the vertical stabilizer so that the trailing edge of the fixed structure is adjacent the leading edge of the rudder. The rudder is movable from a neutral position in which the rudder lies in line with the fixed part of the vertical stabilizer to define a notional centerline to first and second angled positions in which the rudder is angled relative to the fixed part of the vertical stabilizer at a non-zero angle on one or other side of the notional centerline. An actuator is provided to drive the rudder relative to the fixed part of the vertical stabilizer so as to vary the distance between said part of the trailing edge of the fixed part of the vertical stabilizer and the leading edge of the rudder.

7 Claims, 18 Drawing Sheets

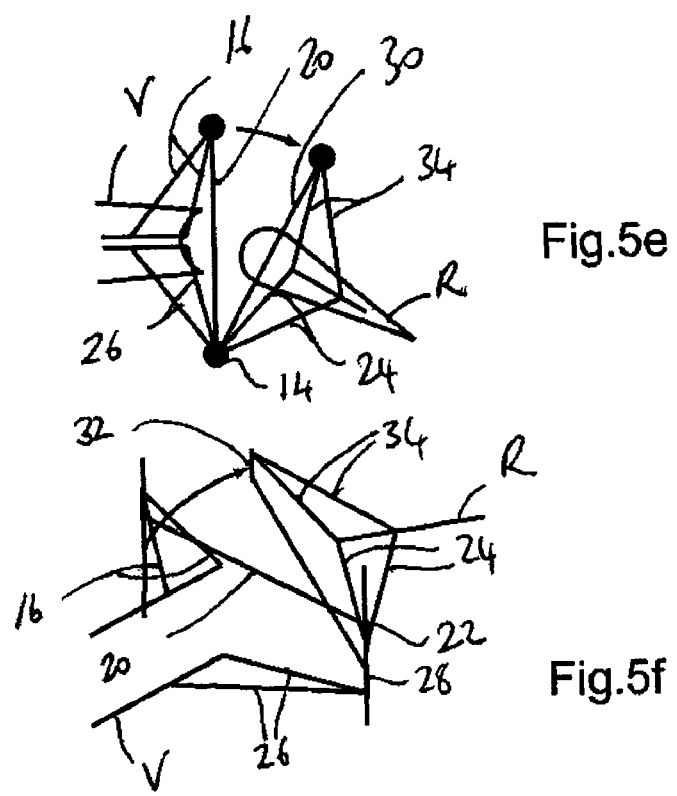
Fig.5e
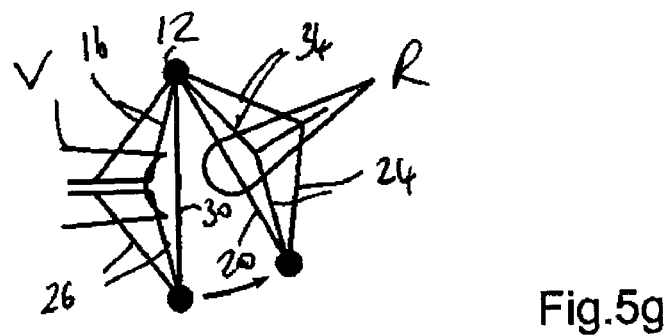
Fig.5f
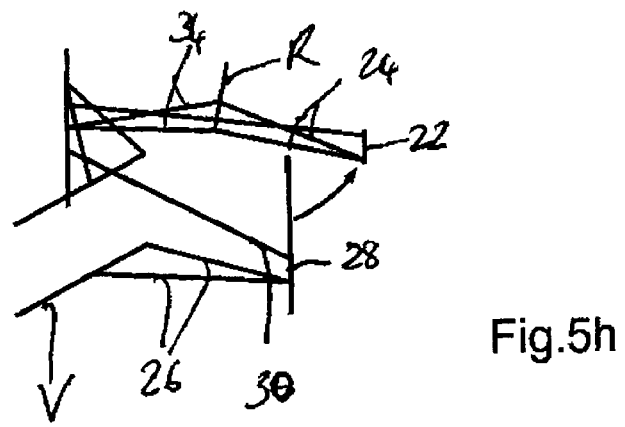
Fig.5g
Fig.5h

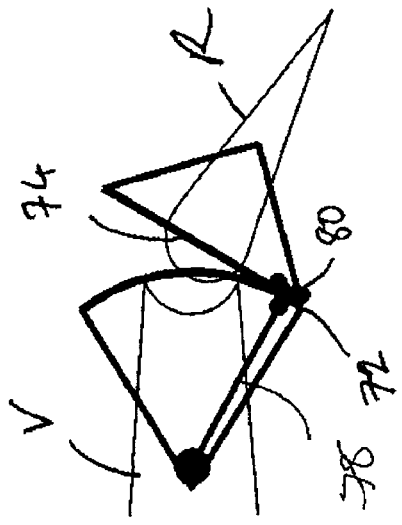
Fig. 13
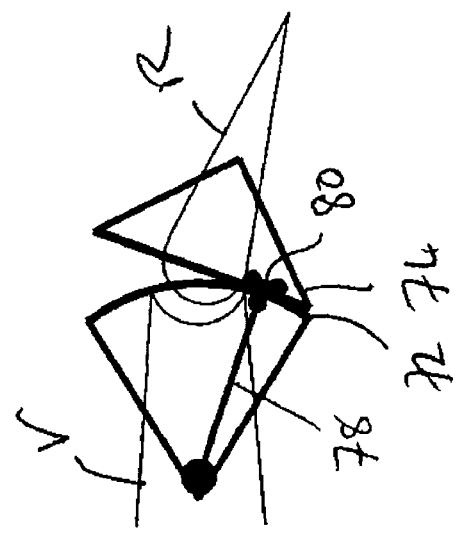
Fig. 14
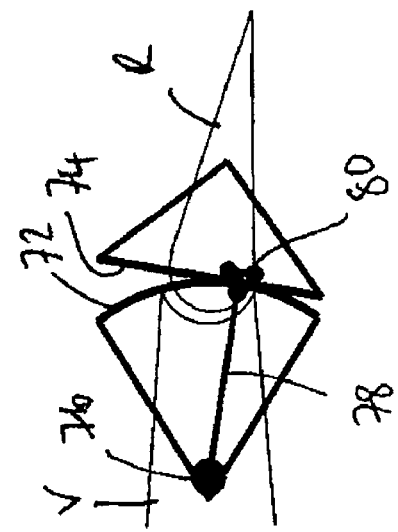
Fig. 15
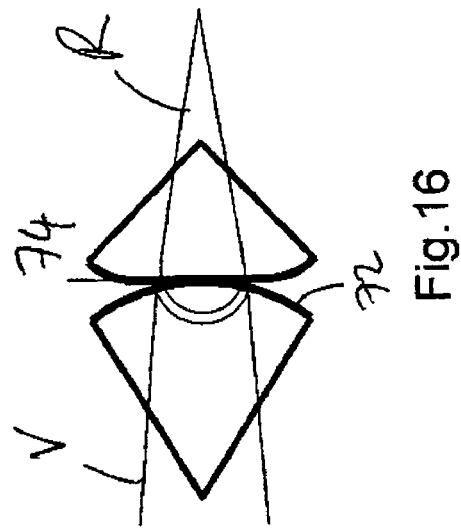
Fig. 16
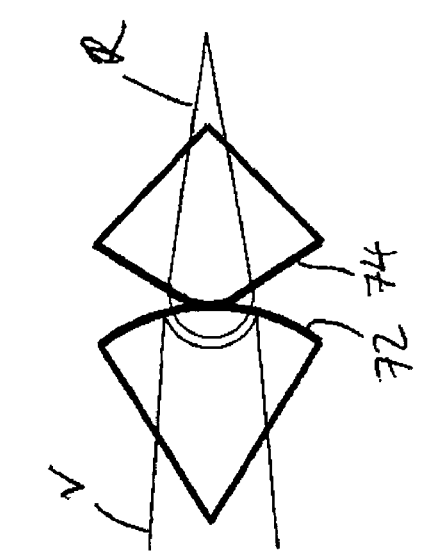
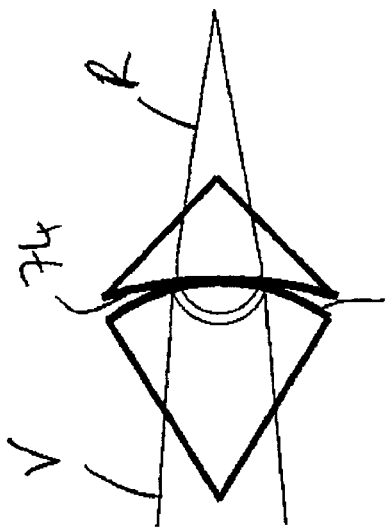

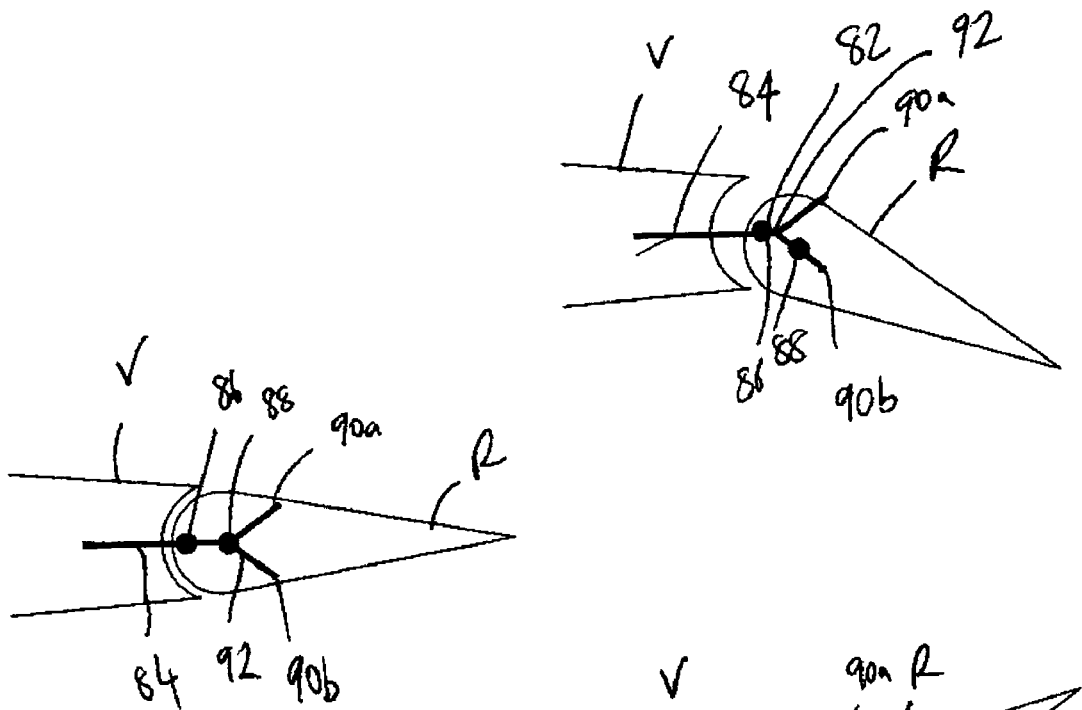
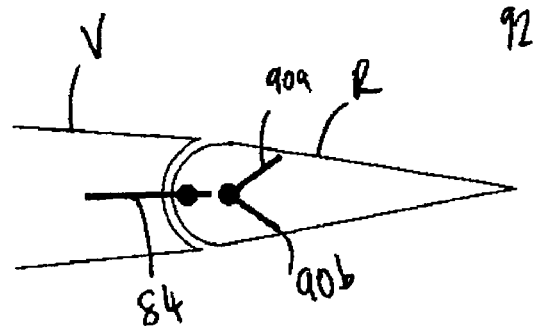
Fig.17
Fig.18
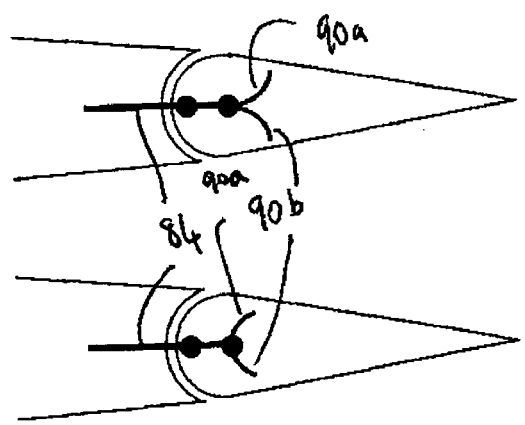
Fig.19
Fig.20

BI-DIRECTIONAL FLIGHT CONTROL SURFACE UTILIZING A SPLIT-TRACK MECHANISM

RELATED APPLICATIONS

The present application is based on, and claims priority from, British Application Number 0814610.2, filed Aug. 11, 2008, the disclosure of which is hereby incorporated by reference herein in its entirety.

FIELD OF THE INVENTION

The present invention relates to a bi-directional flight control surface mechanism, particularly, although not exclusively limited to, a rudder for an aircraft.

BACKGROUND OF THE INVENTION

It is usual for one or more vertical stabilisers to be positioned at the rear of an aircraft (see FIG. 1) and for a rudder R to be fixed to the rear of the fixed part V of the vertical stabiliser. The vertical stabiliser exists to provide lateral directional stability, i.e. to keep the aircraft nose pointing in the direction of flight and the rudder exists to provide lateral directional control, controlling the aircraft in yaw Y, for example in the case of engine failure, and to control the lateral direction of flight, for example during cross-wind landing.

Typical existing rudder mechanisms are shown in FIGS. 2a to 2c. The first mechanism shown in FIG. 2a comprises a fixed structure part V of a vertical stabiliser and a rudder R, or more generically a flight control member, hinged relative to the fixed structure of the vertical stabiliser by means of a simple hinge and the rudder is actuated by means of an actuator A. Most small piston-engined aircraft employ that arrangement.

FIG. 2b shows an off-set hinge arrangement where the hinge for hinging the rudder R to the fixed structure V is slightly off-set to one side of a notional centreline of the fixed structure but which still lies within the vertical stabliser outline. That allows the actuation mechanism also to be fitted within the outline of the vertical stabiliser so as to reduce drag.

Finally, FIG. 2c illustrates a double-hinged rudder arrangement. In that arrangement, the rudder R is formed in two parts $R_1$, $R_2$ which are articulated relative to each other and the rearmost part $R_2$ of the rudder can be actuated relative to the main part of the rudder $R_1$ so as to allow the rudder to be deflected to a greater angle than if the rudder was formed in one piece.

In addition, International Patent Publication No. WO97/32779 discloses a rudder and vertical stabiliser arrangement in which small flaps are formed just ahead of the rudder on the trailing edge of the vertical stabiliser. That arrangement can be used to open a path ahead of the rudder to allow air to flow ahead of the rudder.

European Patent Application Publication No. 0256374 discloses a split symmetrical rudder, each element being deflected independently relative to the fixed structure of the vertical stabiliser. In an extreme deployment both rudder parts can be deployed to effect air braking.

FIGS. 3a to 3e illustrate known trailing edge high lift devices, often referred to as flaps.

FIG. 3a shows a plain, simple hinged flap F on the trailing edge of a wing W. FIG. 3b shows a split flap in which only the lower surface of the trailing edge of the wing is hinged and the upper surface remains fixed in place. In FIG. 3c a slot S is created between the wing and the flap when the flap is deployed which improves airflow over the flap. In FIG. 3d a "Fowler" flap is shown. This arrangement is similar to the split flap except the hinged part of the flap translates rearwardly when deployed effectively increasing the area of the wing. Finally in FIG. 3e, a double-slotted Fowler flap is shown in which the hinged flap part $F_1$ is translatable rearwardly relative to the wing and a second intermediate flap $F_2$ is arranged between the leading edge of the main flap and the trailing edge of the wing. That further flap can be arranged so as to prevent or allow airflow from the underside of the wing to the upper side.

Various Fowler flap and slotted flap mechanisms are known. Flaps may be hinged relative to the wing by means of an off-set hinge, that provides some translation as the flap is deployed. A four-bar linkage may connect the flap to the wing, again providing translation as well as pivoting of the flap. The flap may run on a tailored track member allowing optimum flap travel and positioning for various flap positions.

When designing an aircraft the vertical stabiliser and the rudder are sized by various criteria, such as aircraft lateral stability, control of asymmetric yawing moments and aircraft lateral directional control. It is common for these criteria not to be balanced. Aircraft may require a considerably larger vertical stabiliser and rudder for the case of an engine out yawing moment than to provide normal lateral direction control. In such a case, an oversized stabiliser and rudder is provided which means that the aircraft is heavier and suffers from greater drag to account for the rare instance of an engine failure.

Conventional rudder mechanisms generally comprise a plain flap pivotable in either direction about a pivot point on a centreline of a fixed stabiliser structure. Slotted and Fowler flap designs are more aerodynamically effective for their size but existing slotted and Fowler flap mechanisms are unidirectional.

It is an object of the invention to provide an improved bi-directional flight control surface mechanism.

SUMMARY OF THE INVENTION

According to the invention there is provided a bi-directional flight control surface mechanism comprising a fixed structure having leading and trailing edges and a flight control member having leading and trailing edges, wherein the flight control member is mounted relative to the fixed structure such that part of the trailing edge of the fixed structure is adjacent the leading edge of the flight control member, the flight control member being movable from a neutral position, in which the flight control member lies in line with the fixed structure to define a notional centreline, to a first angled position in which the member is angled relative to the fixed structure at a non-zero angle on one side of the notional centreline or to a second angled position in which the member is angled relative to the fixed structure at a non-zero angle on the other side of the notional centreline and an actuator is provided to drive the flight control member relative to the fixed structure so as to vary the distance between said part of the trailing edge of the fixed structure and the leading edge of the flight control member.

Further advantageous features are set out in the claims appended hereto.

BRIEF DESCRIPTION OF THE DRAWINGS

Various bi-directional flight control surface mechanisms will now be described in detail by way of example and with reference to the accompanying drawings, in which:

FIGS. 5e to 5h are schematic chord-wise cross-section, perspective, chord-wise cross-section and perspective views respectively of the hinge mechanism of FIGS. 5a to 5d operating in a bi-directional flight control surface mechanism in accordance with the invention, FIG. 13 is a series of chord-wise cross-section views of the bi-directional flight control mechanism of FIG. 12 showing the operation of that mechanism, FIGS. 14 to 16 are schematic chord-wise cross-section views of further bi-directional flight control mechanisms similar to FIG. 12 with small variations, FIG. 17 is a series of schematic chord-wise cross-section views of a still further bi-directional flight control mechanism in accordance with the invention, FIGS. 18 to 20 are schematic chord-wise cross-section views of variations of the flight control mechanism of FIG. 17, FIGS. 21a to 21c are schematic chord-wise cross-section views of the bi-directional flight control surface mechanism of FIG. 17 illustrating its operation in more detail.

FIG. 4 illustrates the principle of the present invention. In FIG. 4 a vertical stabiliser comprises a fixed structure or fixed part V and a rudder R. In the upper drawing in FIG. 4 the rudder R and the fixed part V of the vertical stabiliser are arranged in line and a notional centreline L extends from the middle point of the leading edge of the fixed part V of the vertical stabiliser through the middle point of the trailing edge of the rudder R. Conventionally, rudders have pivoted about a pivot point, which is arranged on the centreline L and the rudder can pivot to one side or another of the centreline L about that pivot point. In the present invention, a mechanism is provided to allow the rudder R to pivot to one side or another of the longitudinal centreline and also to move translationally relative to the fixed part V. The lower two drawings in FIG. 4 illustrate that kind of rudder movement. It can be seen in both of those drawings that the rudder has pivoted to one side or another of the centreline L but also a translation of the rudder relative to the fixed part V has taken place.

One mechanism for effecting that translation and pivoting action is described below and is shown in FIGS. 5a to 5h. In the embodiment of FIGS. 5a to 5h, the rudder R is mounted to the fixed part V of the vertical stabiliser by means of a so-called "saloon-door" hinge mechanism.

Figure 1:
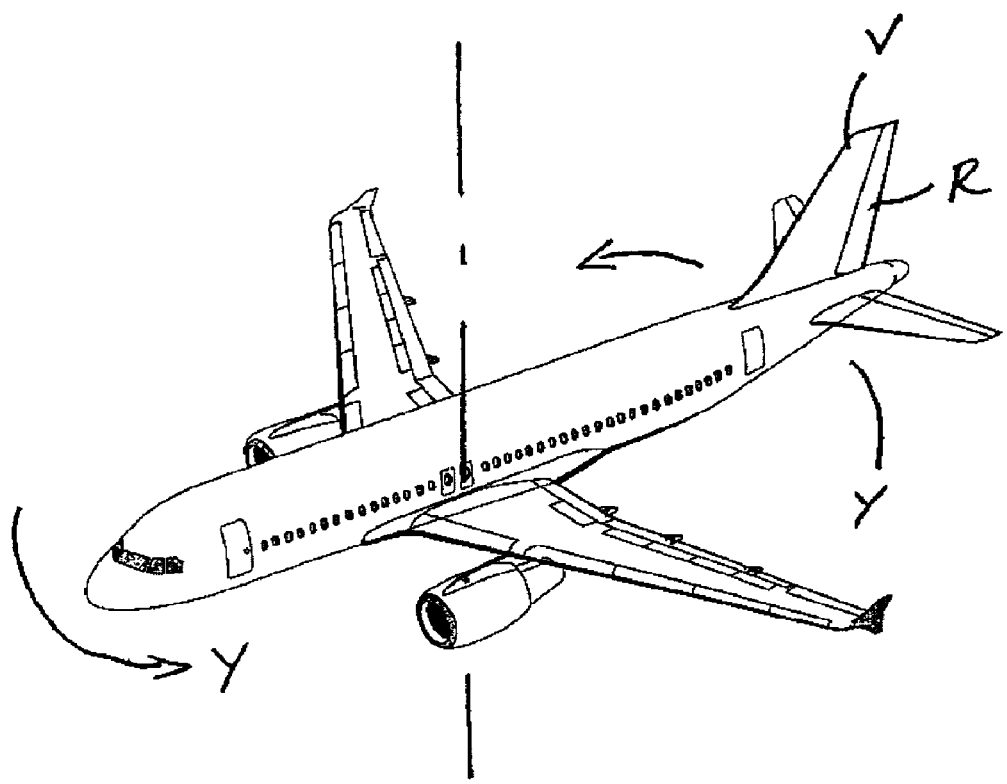
FIG. 1 is perspective view of a typical aircraft.
Figure 2A:
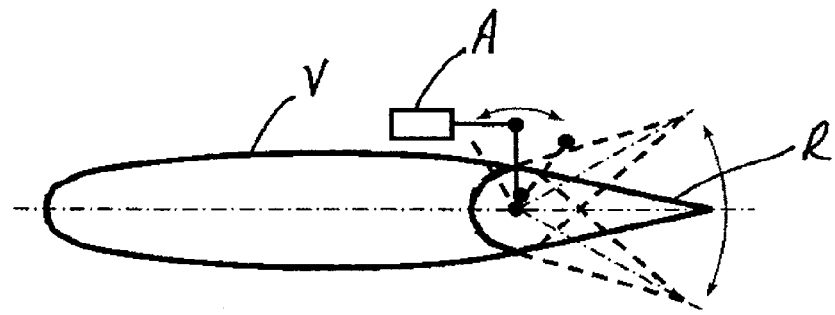
FIGS. 2a to 2c are schematic chord-wise cross-sections through typical aircraft rudder mechanisms.
Figure 2B:
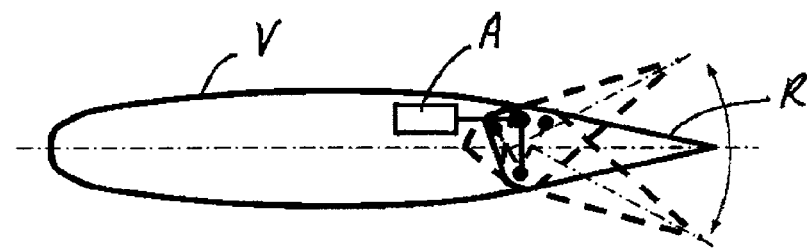
Figure 2C:
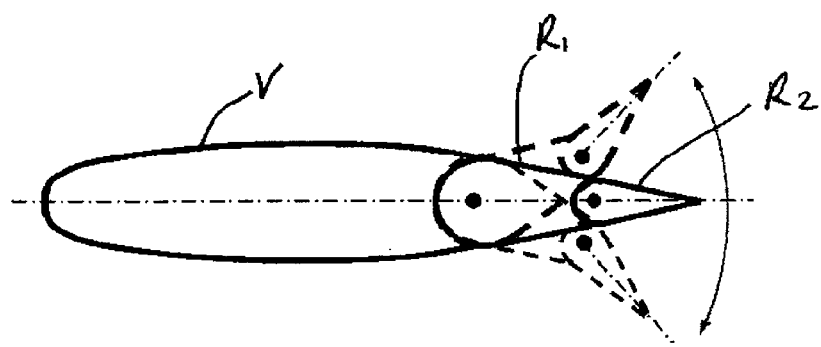
Figure 3A:
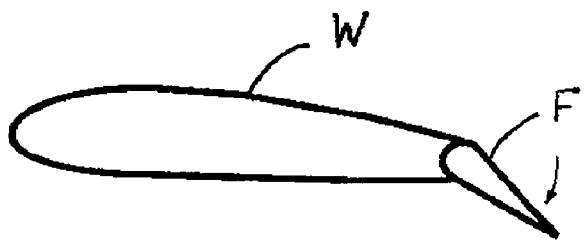
FIGS. 3a to 3e are schematic chord-wise cross-sections through typical aircraft flap mechanisms.
Figure 3B:
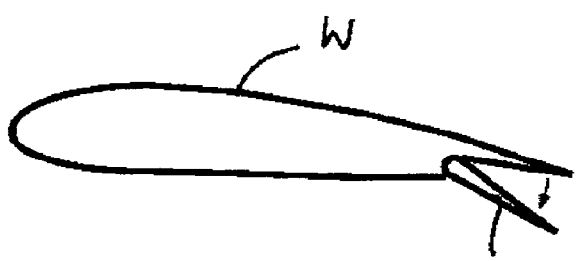
Figure 3C:
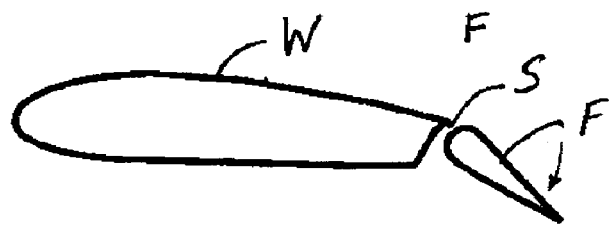
Figure 3D:
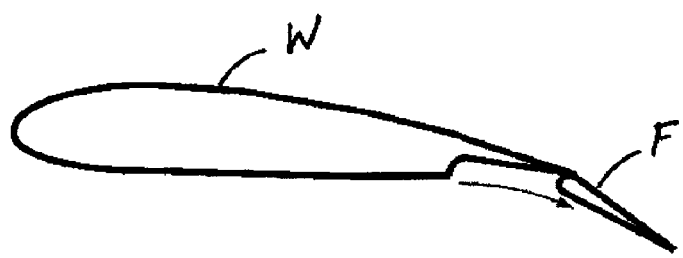
Figure 3E:
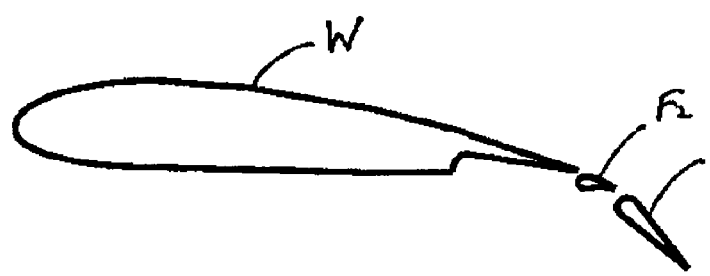
Figure 4:
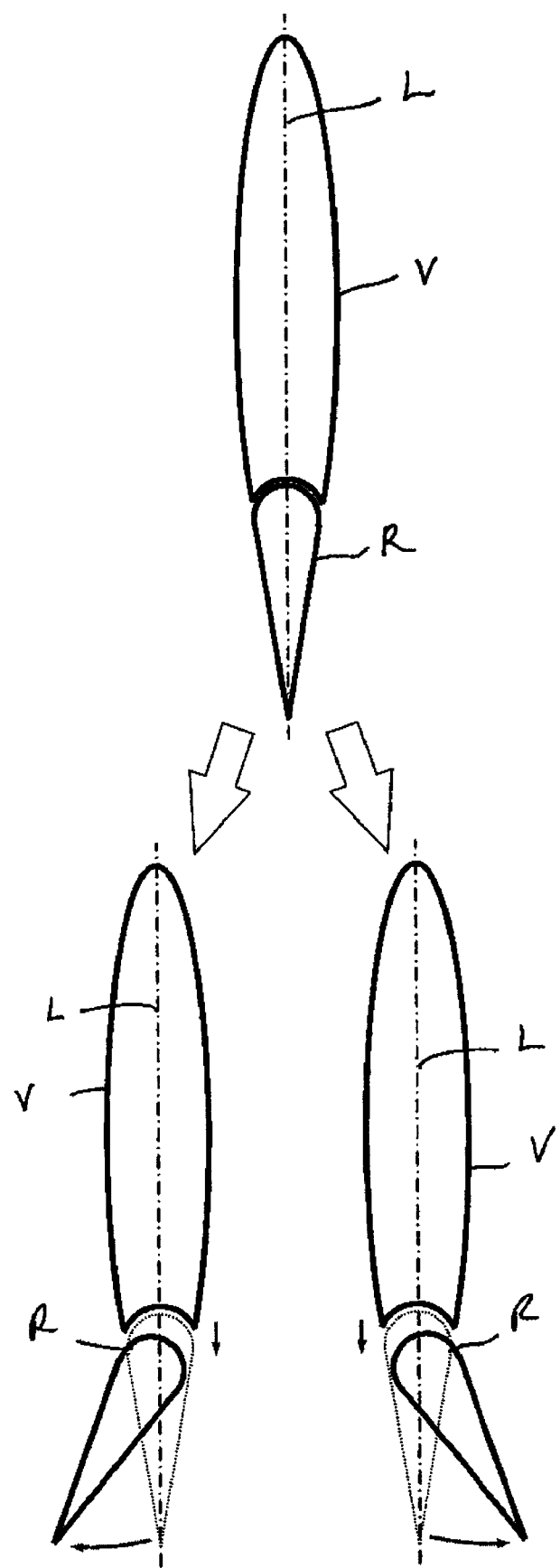
FIG. 4 is a schematic chord-wise cross-section illustrating a bi-directional flight control surface mechanism in accordance with the invention.
Figure 5A:
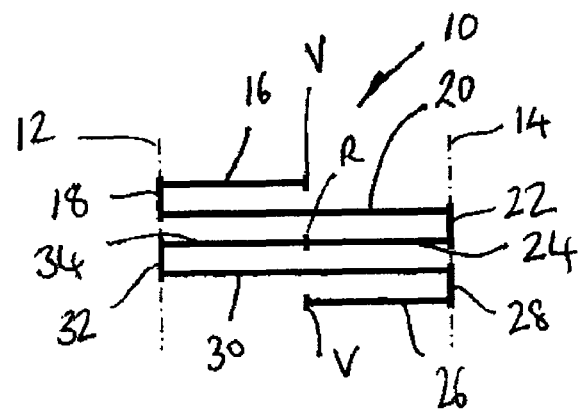
FIGS. 5a to 5d are schematic front elevation, side elevation, chord-wise cross-section and perspective views respectively of a hinge mechanism for a bi-directional flight control surface mechanism in accordance with the invention.
Figure 5B:
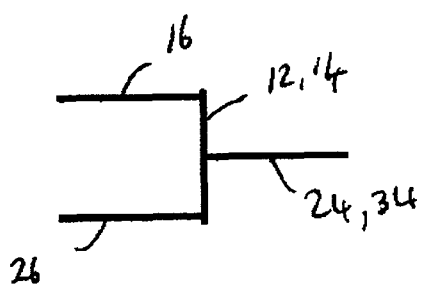
Figure 5C:
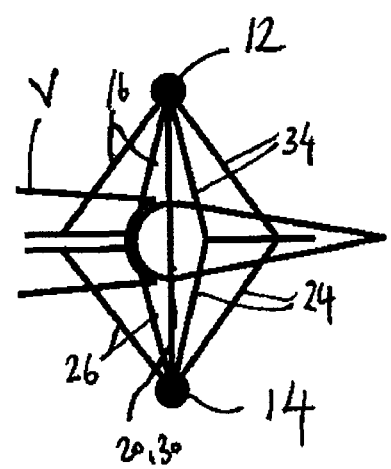
Figure 5D:
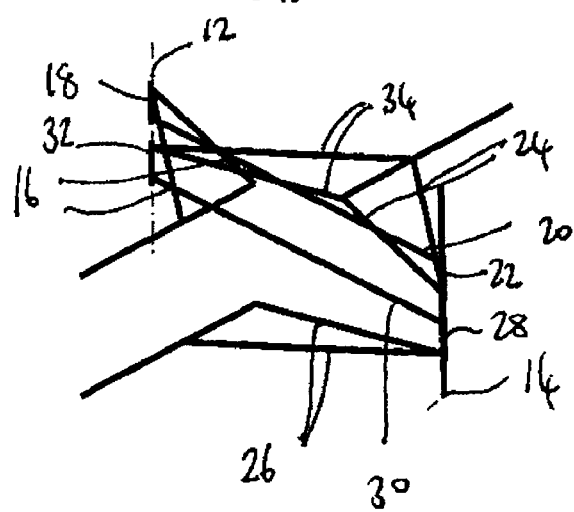

FIG. 5a is a schematic end elevation representation of the saloon door hinge mechanism. The hinge mechanism 10 is defined by a left-hand pivot axis 12 and a right-hand pivot axis 14 spaced apart from the left-hand pivot axis 12. An upper fixed part attachment rod 16 extends from the fixed part V of the vertical stabiliser to the first pivot axis 12. The upper fixed part attachment rod 16 is connected by means of an upper left-hand hinge 18 at the left-hand pivot axis 12 to an upper cross-member 20. The upper cross-member 20 extends from the upper left-hand hinge 18 at the left-hand pivot axis to the right-hand pivot axis 14 where it terminates in an upper right-hand hinge 22. A right-hand rudder attachment rod 24 extends from the upper right-hand hinge 22 to the rudder R.

A lower fixed part attachment rod 26 extends from the fixed part V of the vertical stabiliser to the right-hand pivot axis 14. The lower fixed part attachment rod is hinged by means of lower right-hand hinge 28 to a lower cross-member 30 which extends from the lower right-hand hinge 28 to the left-hand pivot axis 12. The lower cross member 30 is hinged at the left-hand pivot axis 12 by means of a lower left-hand hinge 32 and that, in turn, is hinged to a left-hand rudder attachment rod 34.

In operation, the hinged mechanism 10 can be driven so as to pivot about either the left-hand or right-hand pivot axis, effecting both translation and pivoting of the rudder R.

An actuator (not shown), for example a hydraulic actuator, is connected between the fixed part V of the vertical stabiliser and the upper right-hand hinge 22 and a further actuator (not shown) is connected between the fixed part V of the vertical stabiliser and the lower left-hand hinge 32. By actuating, for example, the lower left-hand hinge relative to the fixed part V of the vertical stabiliser, the hinge mechanism 10 pivots about the right-hand pivot point 14. As shown in FIGS. 5e and f, that actuation effects rearward translation of the rudder R along with pivoting of the rudder R relative to the longitudinal centreline.

Likewise, if the actuator (not shown) acting between the upper right-hand hinge 22 and the vertical stabiliser V is actuated, the cross member 20 pivots outwardly about the pivot axis 12 effecting both translational and pivotal movement (FIGS. 5g and h).

Figure 6A:
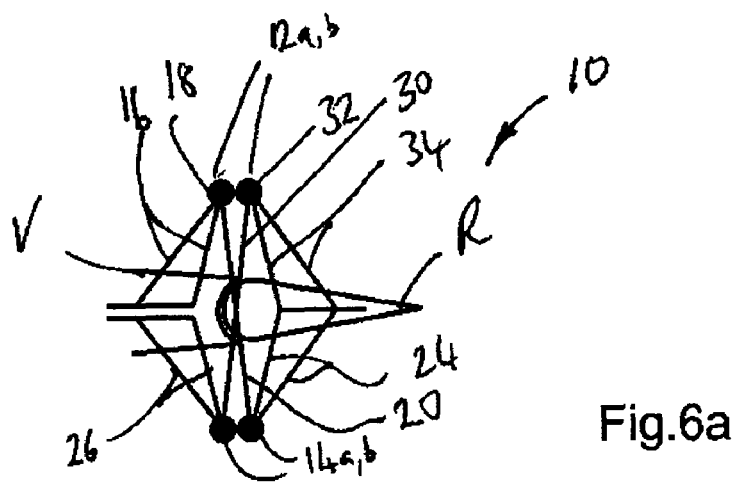
FIGS. 6a and 6b are schematic chord-wise cross-section views of a bi-directional flight control surface mechanism in accordance with the invention.

Whilst the arrangement shown in FIG. 5 is effective, it may be preferable to adopt the arrangement shown in FIG. 6a. In FIG. 6a the hinge mechanism 10 is substantially similar to that shown in FIGS. 5a to 5h. However, the left-hand hinges 18, 32 are arranged axially off-set from each other on axes 12a, b respectively. Also, the right-hand hinges 22, 28 are offset from one another on axes 14a, b. That, in turn, means that the cross-members 20, 30 are arranged in a scissor or crossed fashion.

Figure 6B:
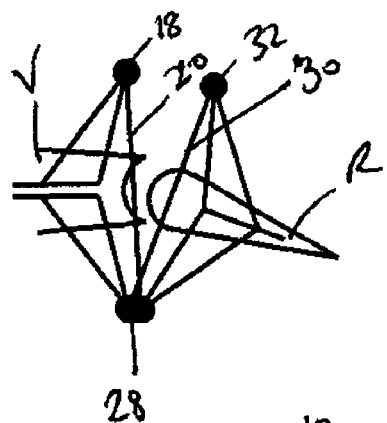

If a tension force is applied to the rudder R in the FIG. 5 arrangement, the geometry of the hinge mechanisms causes high tension loads to be applied to the cross-members 20, 30. By adopting a "non-flat" mechanism as shown in FIGS. 6a and 6b, those compressive loads are reduced. Other than that, the mechanism 10 in FIGS. 6a and 6b operates identically to the mechanism FIGS. 5a to 5h.

Figure 7A:
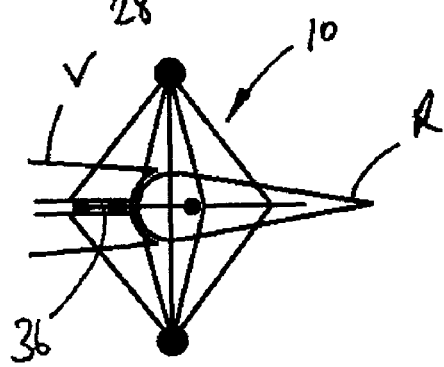
FIGS. 7a and 7b are schematic chord-wise cross-section views of a bi-directional flight control surface mechanism in accordance with the invention.
Figure 7B:
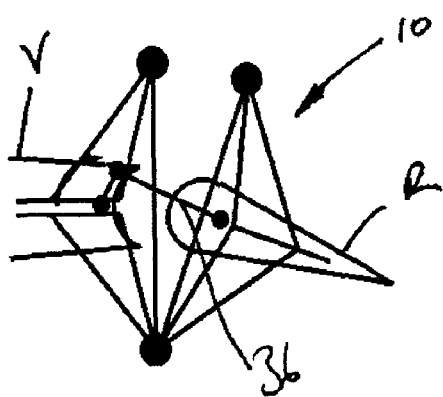

An alternative arrangement is shown in FIGS. 7a and 7b in which a tie bar 36 holds the rudder R to the fixed part of the vertical stabiliser V when the rudder is centred. That creates an alternative load path which avoids the high tension forces being applied to the cross-members 20, 30 even when those cross-members are arranged straight in the FIG. 5 arrangement.

The tie bar 36, as shown in FIG. 7b, comprises a rotational actuator secured to the fixed part V and the rudder R of the vertical stabiliser. The rotational actuator 36 allows for translation of the rudder during pivoting but when the rudder is centred the rotational actuator is arranged at "top dead centre" that allows the tension on the rudder to be applied to a different load path, rather than as tensional loads on the cross members.

Figure 8A:
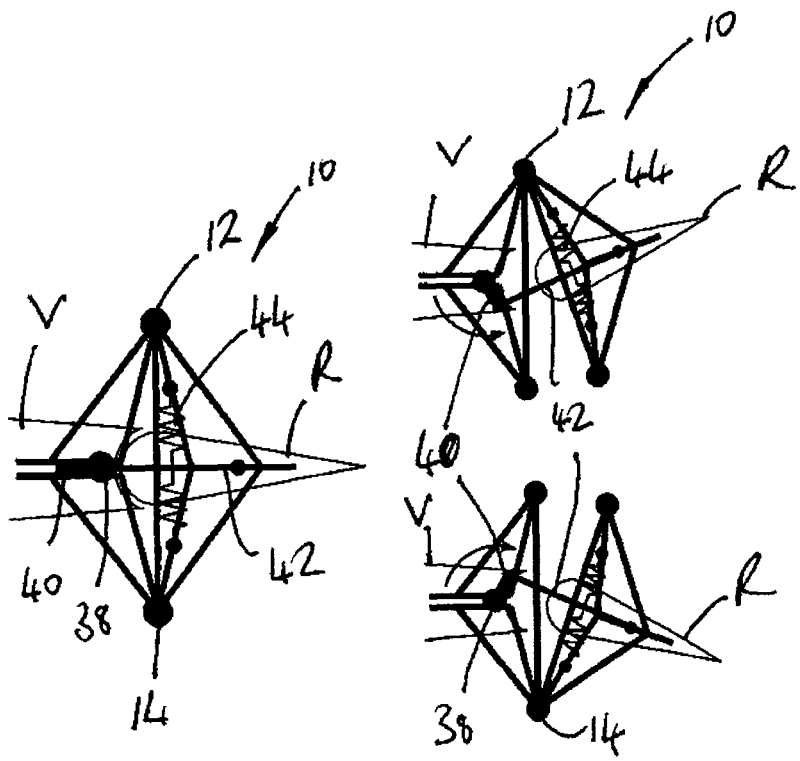
FIG. 8a is a series of schematic chord-wise cross-section views illustrating a further embodiment of a hinge mechanism for a bi-directional flight control surface mechanism in accordance with the invention.
Figure 8B:
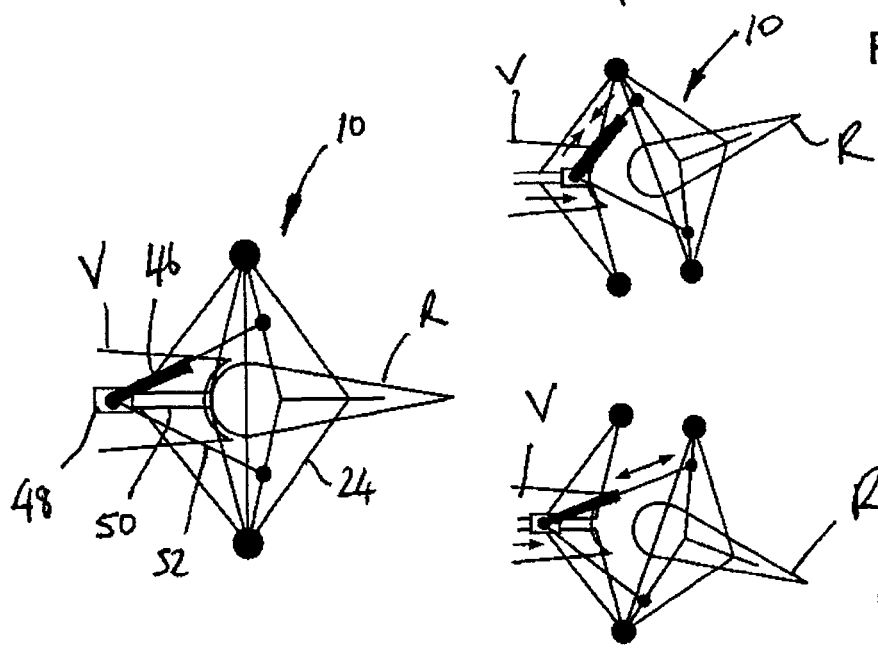
FIG. 8b is a series of schematic chord-wise cross-section views illustrating a further embodiment of a hinge mechanism for a bi-directional flight control surface mechanism in accordance with the invention.
Figure 8C:
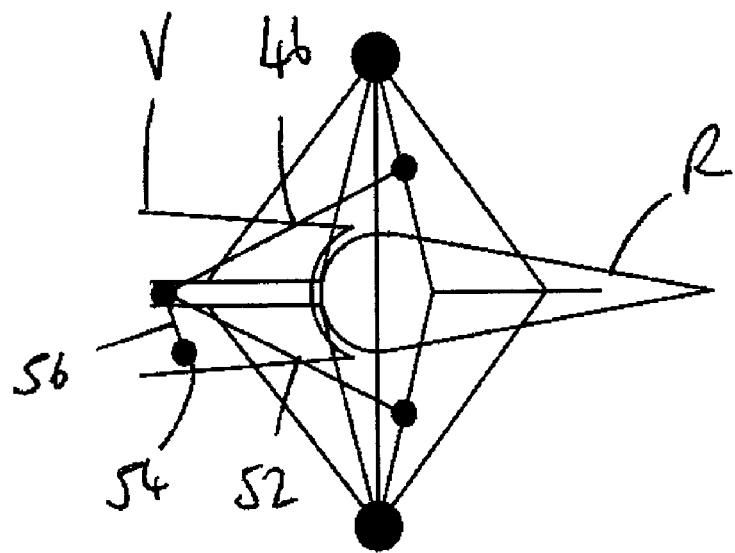
FIG. 8c is a schematic chord-wise cross-section view of another hinge mechanism for a bi-directional flight control surface mechanism.

FIGS. 8a to 8c illustrate alternative actuation mechanisms for the hinge mechanism of FIGS. 5 to 7. In FIG. 8a a rotary actuator 38 is mounted to the fixed part V of the vertical stabiliser. The rotary actuator drives a crank 40 which, in turn, is connected to an arm 42 which extends from the crank 40 to the rudder R.

As the rotary actuator 38 drives the crank 40 in a circle, the arm 42 drives the hinge mechanism 10 so as to effect the aforementioned translation and rotation of the rudder R relative to the fixed part of the vehicle stabiliser V. The spring mechanism 44 is provided on the rudder part of the hinge mechanism 10 so as to minimise angular displacement between the arm 42 and the rudder R.

In FIG. 8b an alternative actuation arrangement for the hinge mechanism 10 is shown. The hinge mechanism 10 is identical to that described in FIG. 5. The actuation mechanism for the hinge mechanism 10 in FIG. 8b comprises a bi-directional linear actuator 46 which extends between the left-hand rudder attachment rod 34 and a sliding pivot carriage 48 slidably mounted on a track 50 in the fixed part V of the vertical stabiliser. The actuator mechanism further comprises a fixed length strut 52 which extends from the right-hand rudder attachment rod 24 to the sliding pivot carriage 48.

Thus, as illustrated in the uppermost drawing in FIG. 8b, in order to move the rudder to the left, the bi-directional linear actuator is contracted, which, in turn, causes the sliding pivot carriage 48 to slide along the track 50 and the fixed length strut to push the right-hand side of the hinge mechanism 10 so as to effect rotation and actuation of the rudder R to the left of the notional centreline of the vertical stabiliser. In order to actuate the rudder R to the right of the notional centreline, the bi-directional linear actuator is extended beyond a centreline rest position of the rudder which, in turn, causes the sliding pivot carriage to slide forwardly of the aircraft along the slide track 50. The fixed length strut is held in place and the extension of the actuator causes the rudder R to pivot to the right.

The arrangement shown in FIG. 8c is substantially identical to that shown in FIG. 8b. However, the sliding pivot carriage 48 is replaced by a fixed pivot with an arm connected to the respective ends of the linear actuator and fixed length strut 46, 52 which lie within the fixed part of the vertical stabiliser V. The arm 56 pivots around the fixed pivot 54 as the linear actuator is actuated in compression and extension so as to effect deflection of the rudder R to one side or the other of the notional centreline of the vertical stabiliser.

Figure 9:
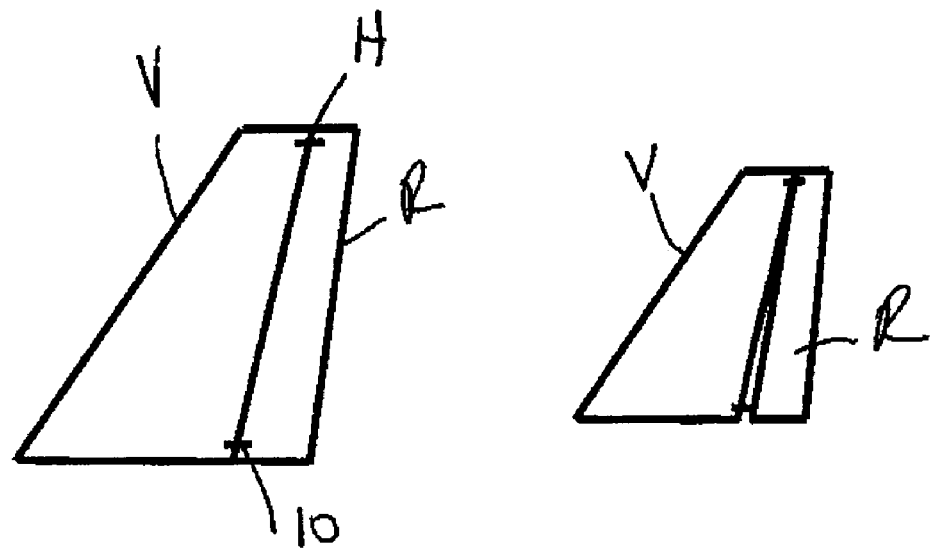
FIG. 9 shows two side elevations of vertical stabiliser of an aircraft incorporating a bi-directional flight control surface mechanism in accordance with the invention.

FIG. 9 illustrates a vertical stabiliser having a fixed part V and a rudder R hinged relative to the fixed part V. The rudder R is mounted relative to the fixed part of the vertical stabiliser V by means of a simple hinge and actuator H at the upper part thereof along with a hinge mechanism 10 as shown in any of FIGS. 5 to 8. That causes the rudder to be deflected at the base thereof when actuated but not at the top. That arrangement may be desirable in certain circumstances, particularly to simplify actuation which may be facilitated by a torque being applied to the simple hinge.

Figure 10A:
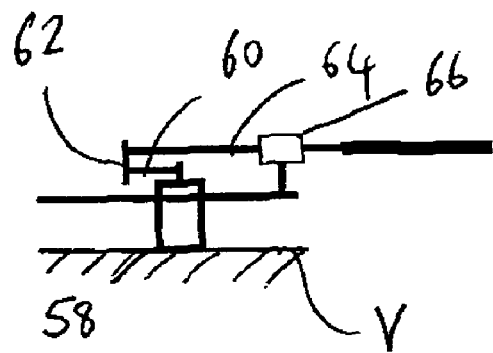
FIGS. 10a to 10c are, respectively, schematic side, chord-wise cross-section and perspective views of a drive mechanism for a further bi-directional flight control mechanism in accordance with the invention.
Figure 10B:
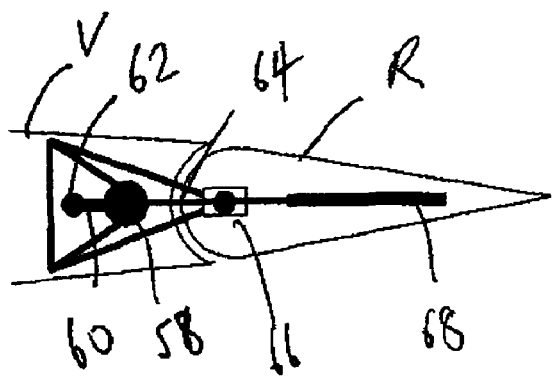
Figure 10C:
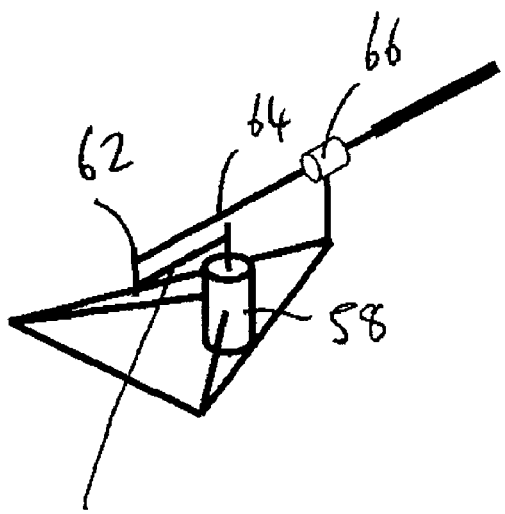

Turning to FIG. 10, an alternative bi-directional flight control surface mechanism in accordance with the invention is shown. In FIG. 10a, a side view shows a rotary actuator 58 fixed (as shown in FIG. 10) to the fixed part V of the vertical actuator. The rotary actuator 58 drives a crank arm 60 which is pivotally connected at its end spaced from the rotary actuator to a pivot 62 and the pivot 62 is connected to a rod 64. The rod 64 extends through a sliding pivot 66 which is fixed to the fixed part V of the vertical stabiliser. The other end of the rod 64 is connected to the rudder R. Actuation of the rotary actuator 58 effects rotational movement of the crank 60 which, in turn, effects pivoting of the rod 64 about the sliding pivot 66.

A particular attraction of the arrangement of FIG. 10 is that small angular displacements result in pivotal rudder movements but as the crank arm deflection increases, the translational movement of the rudder R becomes more influential. Consequently, during normal flight, minor rudder variations may be sufficient but in more extreme circumstances increased rudder deflection and a translational "Fowler" motion can be employed.

Figure 11A:
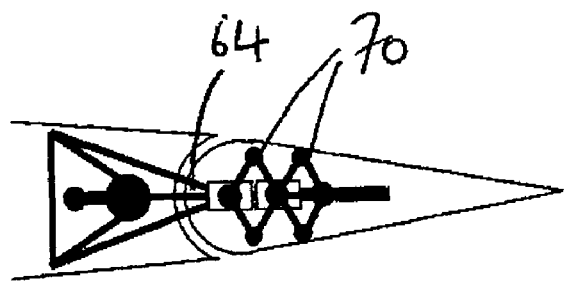
FIGS. 11a to 11d are chord-wise cross-section views of further bi-directional flight control mechanisms in accordance with the invention similar to that shown in FIGS. 10a to 10c.
Figure 11A:
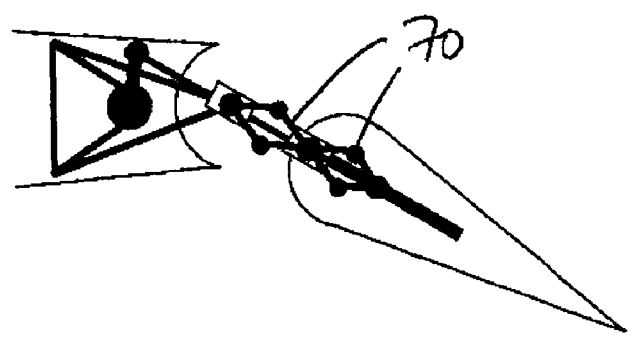
Figure 11B:
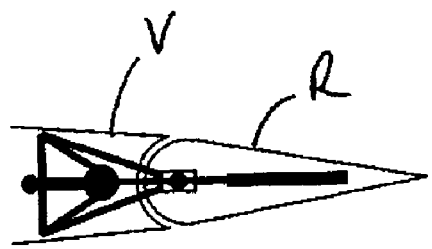
Figure 11C:
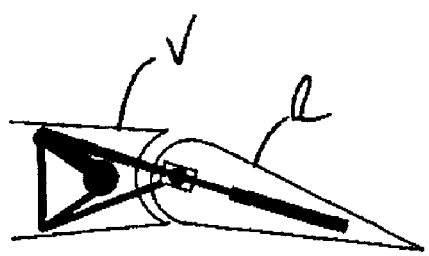
Figure 11D:
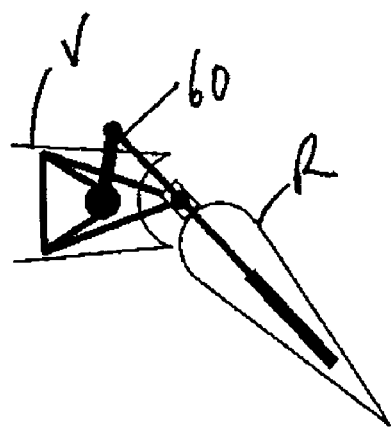

If it is desired to keep the crank of the arrangement of FIG. 10 within the profile of the fixed part of the vertical stabiliser, then the length of the crank arm is limited restricting the amount of so-called "Fowler motion" of the rudder. In FIG. 11a, a solution to that problem is shown in which the elongate rod 64 comprises a pantograph mechanism 70 which can be extended to effect additional Fowler motion.

Where extreme rudder deflection is only required in exceptional circumstances, an oversized crank could be used. In normal flight the arrangement will be as shown in FIG. 11b and conventional rudder deployment would not cause the crank to protrude beyond the structure of the fixed part V of the vertical stabiliser. However, in extreme conditions, as shown in FIG. 11d, the crank could be made to protrude outside the fixed part of the vertical stabiliser V so as to effect the required extreme rudder variation.

FIGS. 12 to 16 illustrate a further alternative bi-directional flight control surface mechanism in accordance with the invention.

Figure 12:
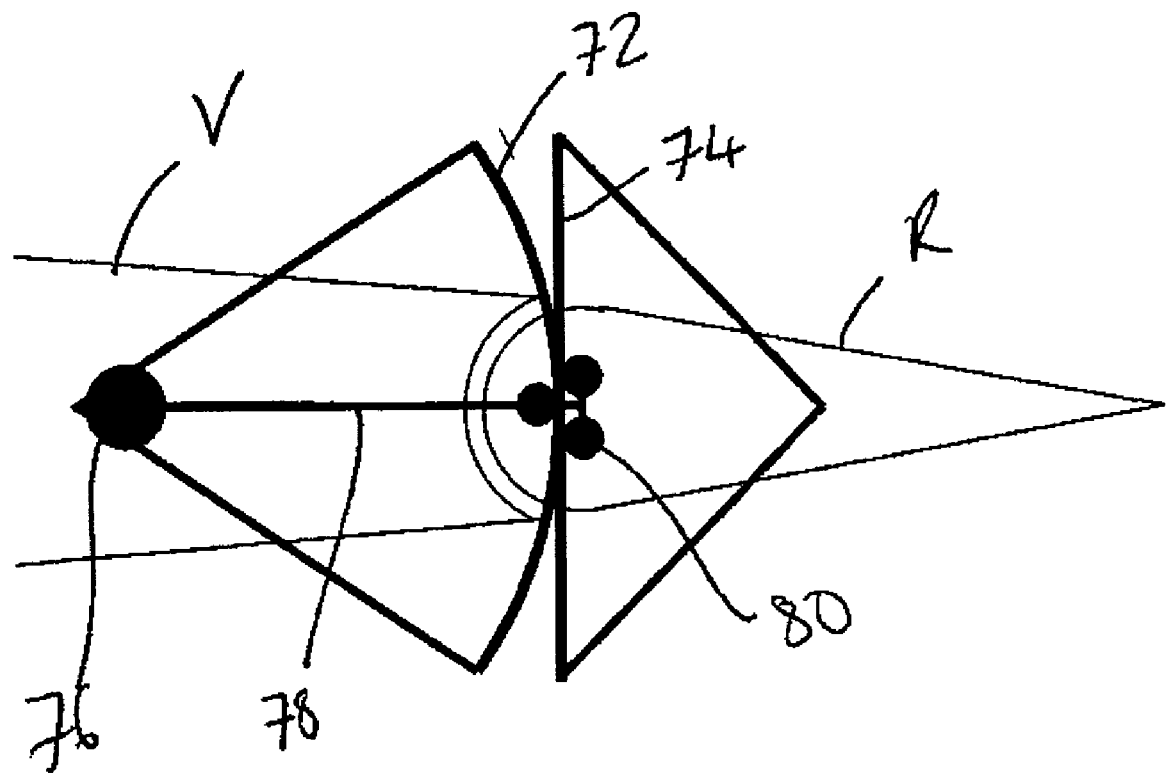
FIG. 12 is a schematic chord-wise cross-section view of a further bi-directional flight control mechanism in accordance with the invention.

In the arrangement of FIG. 12, fixed part V of the vertical stabiliser has an arc-shaped track 72 fitted to it protruding symmetrically on each side of the surface of the fixed part. The arc-shaped track 72 is toothed so as to provide appropriate indexation.

A correspondingly toothed track 74 is mounted to the rudder R. In FIG. 12, the toothed track 74 of the rudder is a straight track. A rotary actuator 76 is mounted within the fixed part of the vertical structure V and drives an arm 78. At the end of the arm 78 spaced from the rotary actuator, a series of rollers 80 are provided to hold the tracks 72, 74 together.

The arrangement of FIG. 12 is shown in FIG. 13. The rotary actuator 76 is driven so that the arm 78 travels clockwise, which, in turn, moves the contact point between the track 72 and 74. That, in turn, rotates and translates the rudder R relative to the fixed part V of the vertical stabiliser.

Altering the shape of the rudder track 74, as shown in FIGS. 14 to 16, will produce different effects.

In FIG. 14, the rudder track 74 is slightly concave relative to the convex fixed track 72. That will tend to lessen the amount of translation of the rudder R relative to the fixed part V. Turning to the arrangement in FIG. 15, the rudder track 74 has a central opposite convex shape compared to the convex shape of the fixed part track 72 and a straighter outer profile. The resulting movement of the rudder R is primarily rotational for small deflections of the rotation arm 78, becoming primarily translational for larger deflections of the rotation arm 78.

In FIG. 16, the rudder track 74 has a flat intermediate profile with curved end portions. The resulting movement of the rudder R is primarily translational for small deflections of the rotation arm 78, becoming primarily rotational for larger deflections of the rotation cam 78.

FIGS. 17 to 21 show a further alternative bi-directional flight control surface mechanism. In FIG. 17, a vertical stabiliser comprises a fixed part V and a rudder R. The rudder R is mounted relative to the fixed part V by means of a carriage 82 running along a grooved track 84.

The carriage 82 comprises two spaced pins or rollers 86, 88. The grooved track 84 has an elongate part extending from the fixed part V which splits into left and right-hand branches 90a, b.

Actuating the rudder by means of a coupling moment would result in the rollers 86, 88 sliding along tracks 84 and 90a or 90b as appropriate.

Alternatively, the track 84 can be provided with a gate mechanism 92 (not shown). The gate mechanism 92 is arranged selectively to close one or other of the branches 90a, 90b of the track 84. In order to actuate the rudder, the rudder R is driven relative to the fixed part V so that the carriage 82 slides along the track 84. If the rudder is to be actuated to the right of the aforementioned notional centreline the gate mechanism 92 closes off the left-hand branch 90a of the track 84 which forces the rollers 88 of the carriage 82 to travel down the right-hand branch 90b. That effects pivoting and translation of the rudder R relative to the fixed part V. In order to move the rudder to the left of the centreline, the rudder is driven back along the track 84. The gate mechanism 92 changes to close off the branch 90b and the rudder is actuated back along the track so as to extend down the branch 90a.

In FIG. 18, the straight part of the track 84 extending from the fixed part V of the vertical stabiliser rearwardly thereof and the two branches 90a, b are separated and a pin or roller 86, 88 runs respectively in each "sub-track".

FIGS. 19 and 20 show alternative track designs in which the branches 90a and 90b follow different paths so as to effect different types of rudder movement.

Figure 21A:
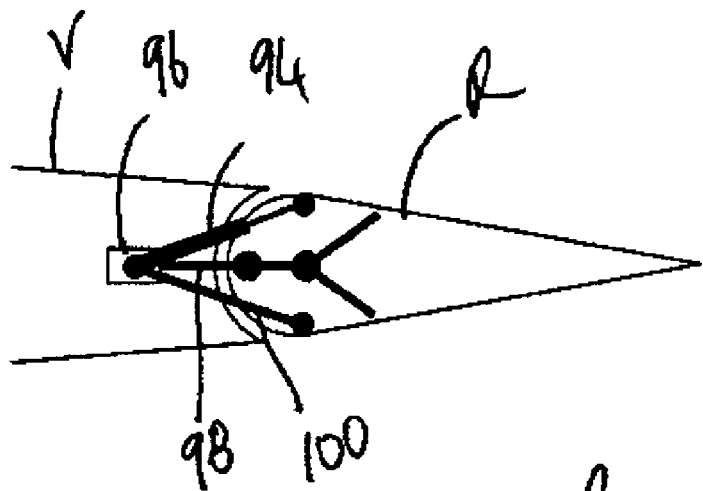
Figure 21B:
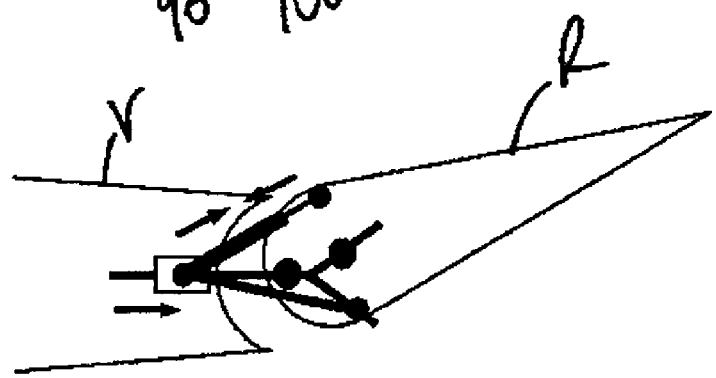
Figure 21C:
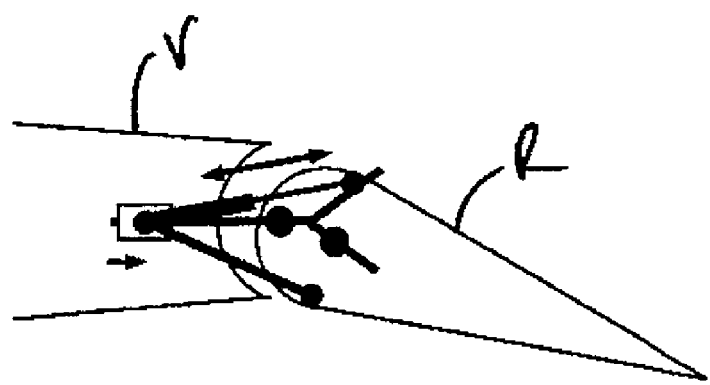

FIGS. 21a to 21c illustrate a possible driving mechanism for the bi-directional flight control surface mechanism of FIGS. 17 to 20. The driving mechanism in FIG. 21 is similar to that shown in FIG. 8 in that it comprises a bi-directional linear actuator 94 mounted between a point on the rudder R and a sliding pivot carriage 96 mounted to a sliding track 98 on the fixed part V of the vertical stabiliser. The fixed length strut 100 extends between the sliding pivot carriage 96 and a point on the rudder spaced across the notional longitudinal centreline from the point on the rudder that the linear actuator is mounted.

In FIGS. 21b and c, contraction and extension of the linear actuator effects movement of the rudder to the left and right of the longitudinal centreline whilst effecting translation of the rudder relative to the fixed part V.

Figure 22:
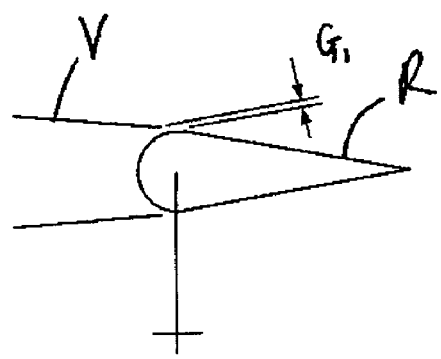
FIG. 22 shows two schematic chord-wise cross-section views for a bi-directional flight control surface mechanism in accordance with the invention having a first leading edge profile.
Figure 22:
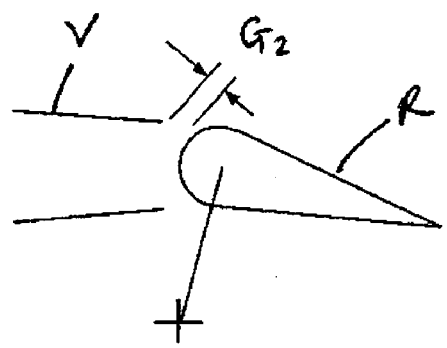
Figure 23:
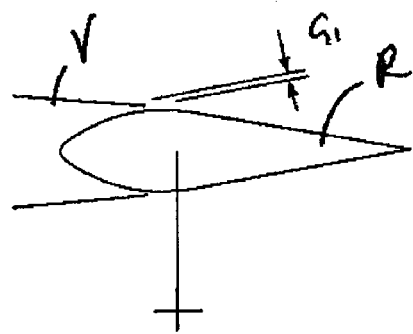
FIG. 23 is a view similar to FIG. 22, this time with the flight control member having a second, different leading edge profile.
Figure 23:
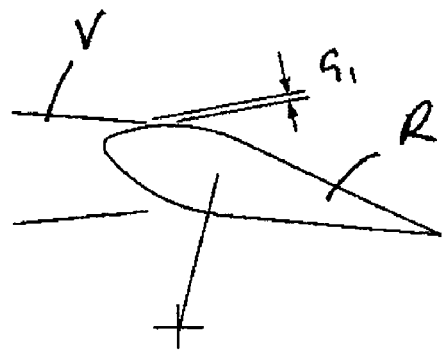

All of the bi-directional flight control surface mechanisms previously described result in the flight control member translating relative to the fixed stabiliser. Put another way, the rudder translates relative to the fixed part of the vertical stabiliser during operation, creating a slot between the fixed vertical stabiliser and the rudder. It is advantageous to control the airflow through that slot by controlling the slot gap throughout a range of rudder deflections. This is shown in FIG. 22. In the left-hand picture in FIG. 22 the rudder R is in a neutral, rest position and a small gap $G_1$ exists between the trailing edge of the fixed part V of the vertical stabiliser and corresponding leading portion of the rudder R. On translation and rotation of the rudder R, relative to the fixed part V, the slot gap $G_2$ widens considerably.

In the present invention it is advantageous to select a more tailored nose profile of the rudder R so that translation of the rudder R relative to the fixed part V of the vertical stabiliser maintains a desired slot gap width between the trailing edge of the fixed part V and the rudder R.

Figure 24:
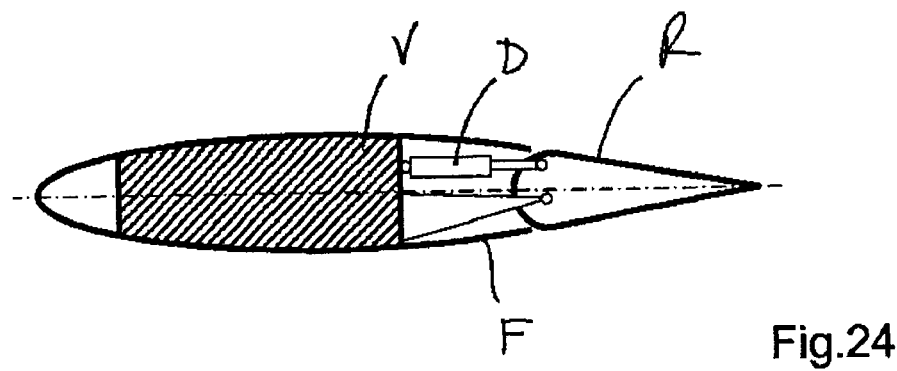
FIG. 24 is a schematic chord-wise cross-section view of a bi-directional flight control surface mechanism in accordance with the invention.
Figure 25:
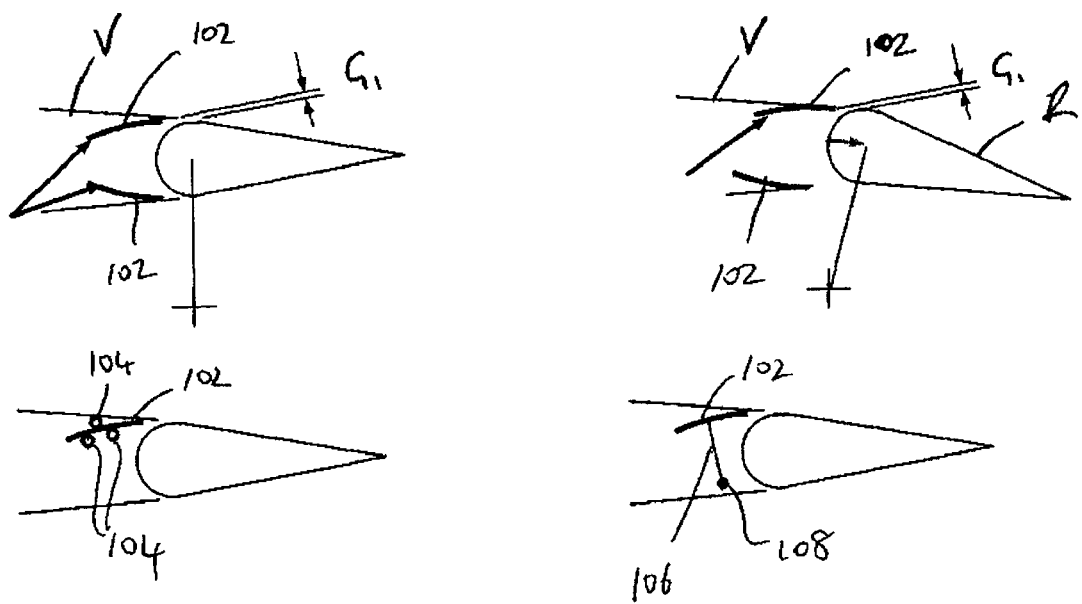
FIG. 25 is a series of schematic chord-wise cross-section views of a still further bi-directional flight control surface mechanism in accordance with the invention.

In FIG. 24 a typical vertical stabiliser and rudder arrangement is shown. A vertical stabiliser comprises a fixed part V and a rudder R with a drive mechanism D arranged therebetween. A falsework F is arranged around the drive mechanism D to shroud the drive and to improve aerodynamic efficiency of the stabiliser. However, this part has no structural purpose. In the present invention, a sliding falsework arrangement is provided in the form of a translating sleeve 102 which can translate rearwardly of the vertical stabiliser fixed part V as the rudder R is translated rearwardly so as to maintain the slot gap $G_1$. That translating sleeve 102 could be carried on rollers 104 which can be driven back and forth as shown in the bottom left figure in FIG. 25 or it can be arranged on an arm 106 and driven by means of a rotary actuator 108.

Figure 26A:
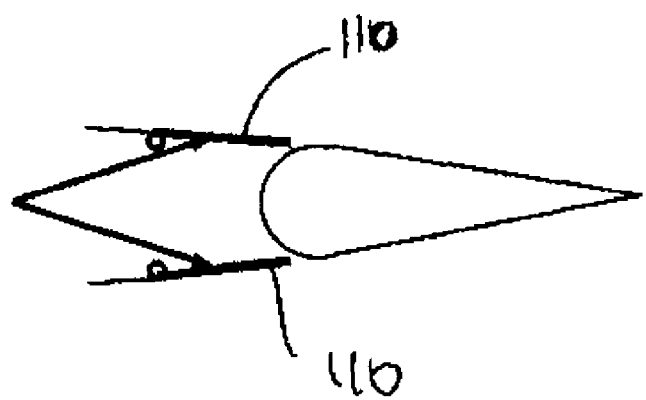
FIGS. 26a and 26b are schematic chord-wise cross-section views of part of a bi-directional flight control surface mechanism in accordance with the invention, As mentioned above, it is typical for an aircraft to include a vertical stabiliser at the rear comprising a first part V and a rudder R. More generally the rudder R might be known as a flight control member but for the purposes of the description that follows, such a member will be described as a rudder.
Figure 26B:
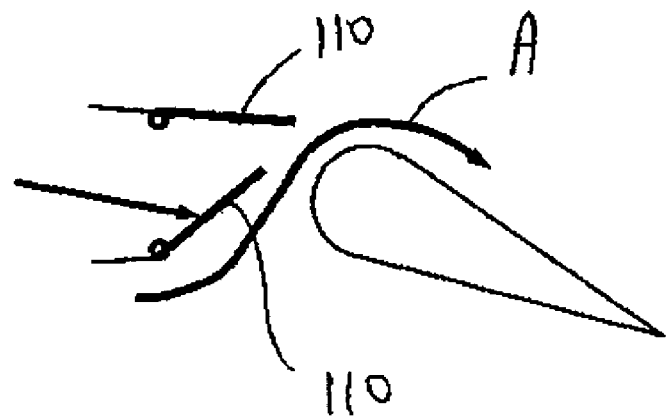

Slotted flaps on wings operate by allowing air to flow from the lower surface of the wing through to the upper surface which re-energises the upper surface air flow. It is desirable to incorporate that re-energising mechanism in a bi-directional flight control surface mechanism. That can be effected as shown in FIGS. 26a and 26b by providing pivoting doors 110 in the rearmost part of the falsework which can deflect inwardly as the rudder is translated so as to improve airflow A onto the opposite side of the rudder. The door operation can be passive, i.e. the doors are actuated by the positive pressure difference between the left and right-hand surfaces on the vertical stabiliser or active so that the doors are driven simultaneously with driving of the rudder. It is intended that those doors will move inwardly only relative to the vertical stabiliser structure.

All of the above arrangements provide a bi-directional flight control member which can be sized to an operational case but which can be altered in an emergency to provide the requisite flight control.

The invention claimed is:

1. A bi-directional rudder mechanism, comprising:
a fixed structure having leading and trailing edges,
a rudder having leading and trailing edges,
wherein the rudder is mounted relative to the fixed structure such that part of the trailing edge of the fixed structure is adjacent the leading edge of the rudder, the rudder being movable from a neutral position, in which the rudder lies in line with the fixed structure to define a notional centreline, to a first angled position in which the rudder is angled relative to the fixed structure at a non-zero angle on one side of the notional centreline or to a second angle position in which the rudder is angled relative to the fixed structure at a non-zero angle on the other side of a notional centreline and an actuator is provided to translate the rudder relative to the fixed structure so as to vary the distance between the part of the trailing edge of the fixed structure and the leading edge of the rudder,
wherein the rudder is mounted on a track so as to be movable relative to the fixed structure, and
wherein the track is Y-shaped.

2. A bi-directional rudder mechanism according to claim 1 in which the rudder is driven relative to the fixed structure by means of an actuator driving a crank pivotally connected to a rod.

3. A bi-directional rudder mechanism according to claim 1 in which the flight control member has a tailored nose profile so that when the flight control member is translated away from the fixed structure and pivoted to one side of the notional centreline, the nose maintains a desired gap on the other side of the notional centreline between the flight control member and the fixed structure.

4. A bi-directional flight control surface mechanism according to claim 3 in which the tailored nose profile is bullet shaped.

5. A bi-directional rudder mechanism according to claim 1 in which there is provided a sleeve member arranged between the fixed structure and the flight control member, the sleeve member being actuable between the fixed structure and the flight control member to close the gap between the fixed structure and the flight control member.

6. A bi-directional rudder mechanism according to claim 1 in which a door is pivotally mounted to the trailing edge of the fixed structure to close a gap between the trailing edge of the fixed structure and the leading edge of the flight control member whereby the door is actuable inwardly relative to the fixed structure so as to allow passage of air from one side of the fixed structure to the other.

7. A bi-directional rudder mechanism, comprising:
a fixed structure having leading and trailing edges,
a rudder having leading and trailing edges,
wherein the rudder is mounted relative to the fixed structure such that part of the trailing edge of the fixed structure is adjacent the leading edge of the rudder, the rudder being movable from a neutral position, in which the rudder lies in line with the fixed structure to define a notional centreline, to a first angled position in which the rudder is angled relative to the fixed structure at a non-zero angle on one side of the notional centreline or to a second angle position in which the rudder is angled relative to the fixed structure at a non-zero angle on the other side of a notional centreline and an actuator is provided to translate the rudder relative to the fixed structure so as to vary the distance between the part of the trailing edge of the fixed structure and the leading edge of the rudder,
wherein the rudder is mounted on a track so as to be movable relative to the fixed structure, and
wherein the track comprises a main portion, along the notional centreline, which diverges into two branches.

* * * * *